June 18, 1957 R. V. DE VAULT 2,795,843
INSERT DEVICE
Filed Sept. 24, 1953 3 Sheets-Sheet 1
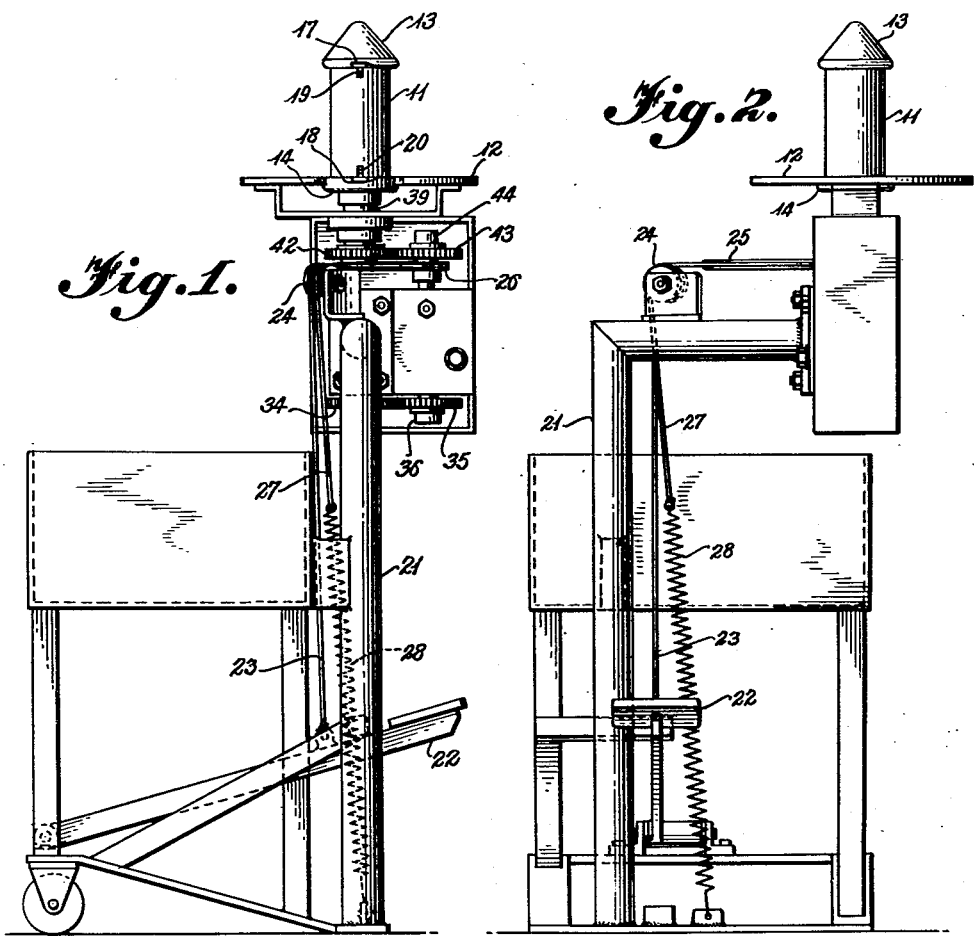
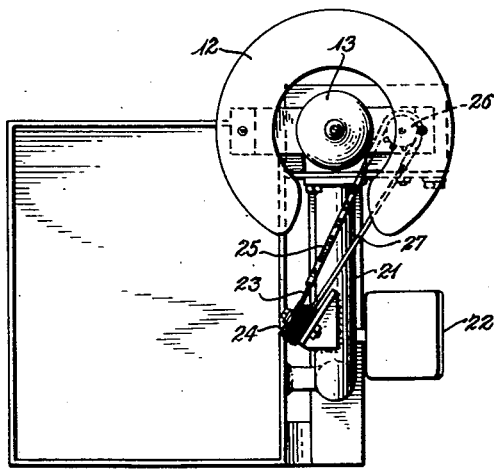
INVENTOR
Robert V. DeVault
BY Met R. Poston
ATTORNEY

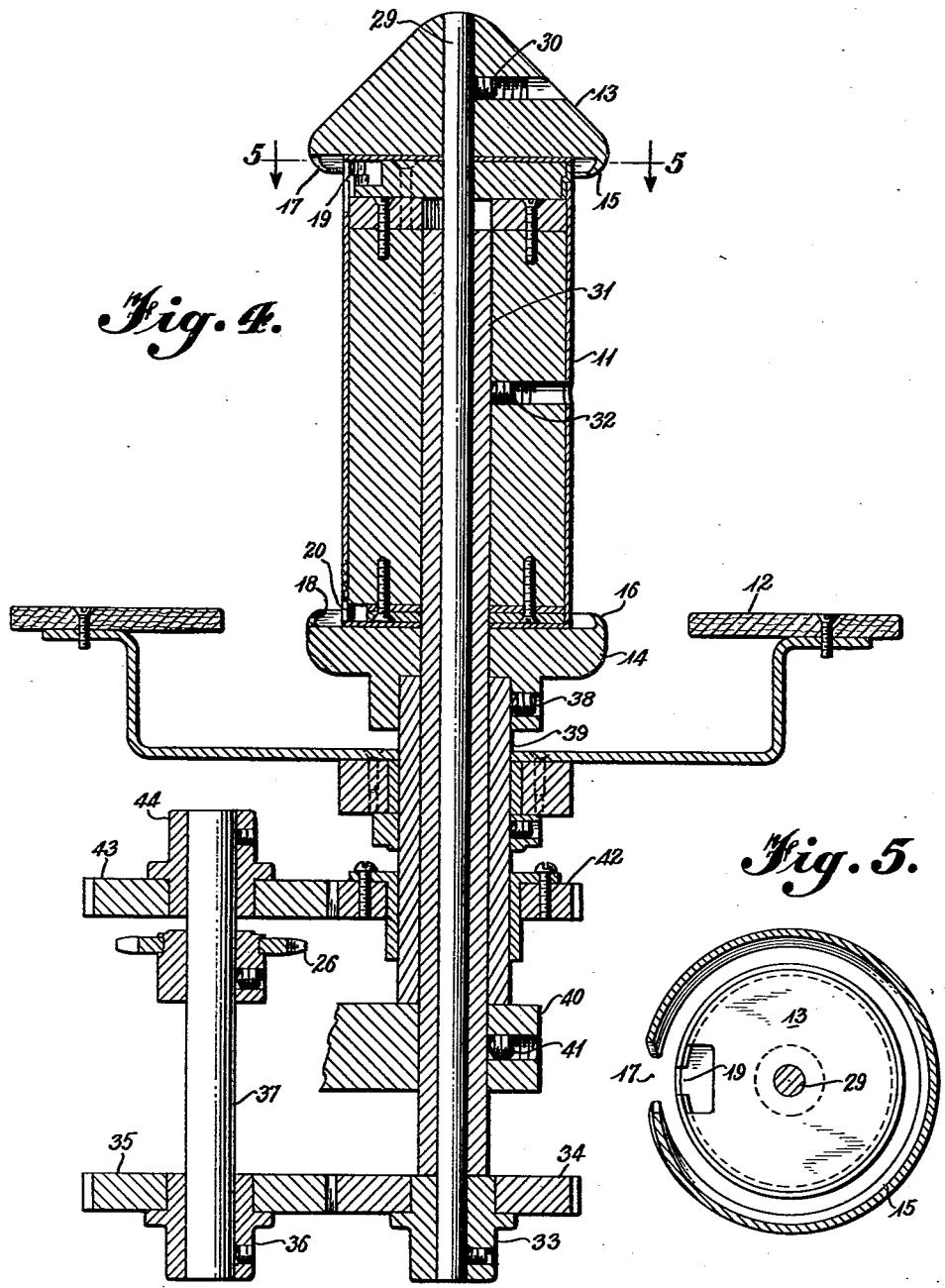

June 18, 1957 R. V. DE VAULT 2,795,843
INSERT DEVICE
Filed Sept. 24, 1953 3 Sheets-Sheet 3
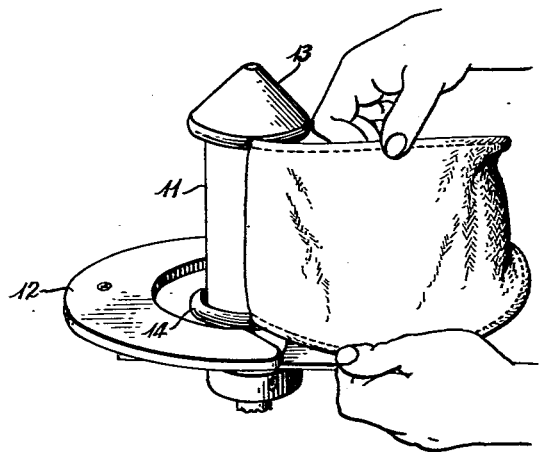
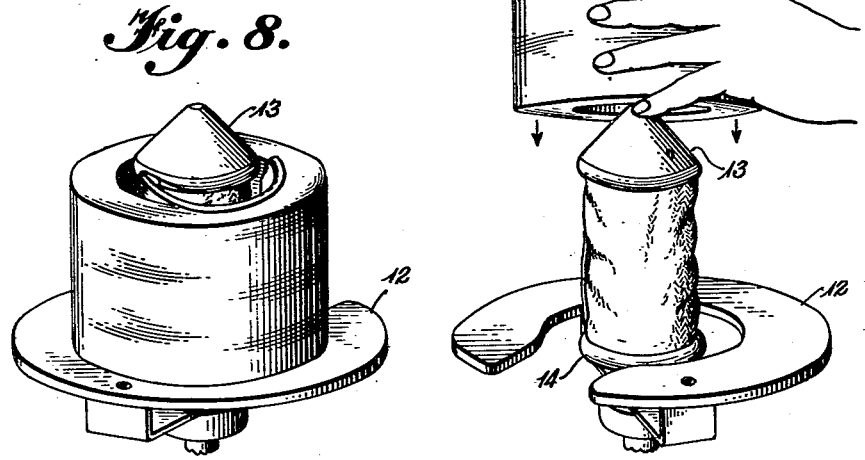
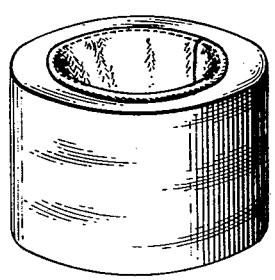
INVENTOR
*Robert V. DeVault*
BY *Mel R. Poston*
ATTORNEY

United States Patent Office 2,795,843
Patented June 18, 1957

2,795,843

INSERT DEVICE

Robert V. De Vault, Enka, N. C., assignor to American Enka Corporation, Enka, N. C., a corporation of Delaware Application September 24, 1953, Serial No. 382,146

5 Claims. (Cl. 29—229)

This invention relates to the application of an expansible covering material to freshly spun hollow cakes of rayon in preparation for various after-treatments and more particularly to a method and apparatus for applying an expansible wire insert to a freshly spun hollow cake of rayon as a protection during subsequent handling involving liquid after-treatment and re-winding during the coning operation.

Normally, freshly spun cakes of rayon are either subject to a lacing operation such as shown in U. S. Patent No. 1,988,778, or to a socking operation such as that shown in U. S. Patent No. 2,418,657. Both of these systems are more or less complicated and time consuming. In order to simplify and make more efficient the above system, expansible wire inserts were developed which cover the interior and a substantial portion of both ends of the cake. With the use of these inserts it was found that there was considerable leakage of liquid over the cake while processing on the bleach-track. In an effort to overcome this undesirable feature a new narrow insert was developed which expanded a shorter distance over the ends of the cake. The new inserts are similar to the earlier insert except they are about one inch narrower. When placed in the cake the new insert expands an average of 7/16 inch over the ends of the cake allowing for additional exposed portions of the cake so that better sealing will result on the bleaching car tray. The ends of the wires of the new insert in addition meet or slightly overlap the ends of the cake whereas the original insert lacked approximately 1 1/8 inches of meeting, leaving a rather wide gap between the ends of the wire. The new inserts were found to be as permeable as those of the normally laced cake and superior to the earlier insert.

With the development of the narrow expansible insert one method of putting the expansible insert in the cake was described in the U. S. application to Henry, Serial No. 195,879, filed on November 15, 1950, now Patent No. 2,728,529, dated December 27, 1955. In some cases this could not be used since the lesser width of these narrow inserts did not allow the use of this device for inserting. Thus a new device was developed which would allow for satisfactorily placing the narrow insert in the cakes.

The device of the present invention is an improvement over the device of the above referred to application in that it facilitates the handling of the cakes and allows for a less skilled attendant to perform the operation.

It is therefore an object of this invention to provide an apparatus for the application of an expansible insert to a hollow yarn package.

Other objects and advantages of this invention will become apparent from the following detailed description when considered in conjunction with the accompanying drawings, wherein:

Figure 1 is an elevation view of the apparatus of the present invention, for applying inserts to freshly spun rayon cakes;

Figure 2 is an elevation view of the apparatus taken at right angles to Figure 1;

Figure 3 is a plan view of the apparatus of Figure 1;

Figure 4 is a fragmentary sectional view of the apparatus of Figure 1 showing in detail that portion of the apparatus around which the insert is wound and over which the cake is positioned;

Figure 5 is a sectional view taken along line 5—5 of Figure 4;

Figures 6–8 are perspective fragmentary views showing the cycle of operation of applying a wire insert to a rayon cake; and Figure 9 is a perspective view of a rayon cake having an insert expanded therein.

Referring now to the drawings and more particularly to Figures 1–3 the inserting mechanism includes a stationary cylinder 11 about which the expansible wire insert is wound and which also fits within the hollow portion of the cake after the cake has been placed on an open ring 12 subsequent to the winding of the insert about the cylinder 11. At the top and bottom of the cylinder are rotating caps 13 and 14, respectively, which have concave edges 15 and 16, respectively (see Figure 4) projecting over the ends of the cylinder 11 to form a race in which the wires of the insert are wound when the caps are rotated. Small openings 17 and 18 in the sides of the projecting edges of the caps serve to guide the wires of the insert as they are wound and unwound from the caps. These openings when the apparatus is in the position of repose are aligned with small holes 19 and 20 in the top and bottom edges, respectively, of the stationary cylinder so that the ends of the wires of the inserts can be held while the caps are rotated to wind the edges of the insert within the projecting edges of the caps and the remainder of the insert about the stationary cylinder. The inserting mechanism is carried on a frame 21. Pivotally mounted on the frame 21 is a foot pedal 22 to which one end of a wire 23 is attached. The wire 23 passes over one of a pair of sheaves 24 and is attached at its other end to one end of a sprocket chain 25 which passes around a sprocket 26 operatively connected to the rotatable caps through a gear train described more fully hereinafter. The other end of the sprocket chain is attached to one end of a wire 27 which passes over the other of said sheaves. The other end of the wire 27 is attached to a spring 28 which is in turn attached to the frame 21. Upon depressing the foot pedal 22 the caps 13 and 14 are rotated in a direction to spirally wind the flexible wire insert. Upon releasing the depressed pedal the spring 28 upon being allowed to contract rotates the caps in the opposite direction and thereby unwinds the insert and returns all parts of the apparatus to their original positions.

Referring now more particularly to Figure 4, cap 13 is fixed by a set screw 30 to a shaft 29 passing coaxially through the cylinder 11. The shaft 29 carries a bearing 31 to which the cylinder 11 is fixed by a set screw 32. Secured on the lower end of the shaft 29 is a flanged collar 33 upon which a gear 34 is mounted. Meshing with gear 34 is a gear 35 mounted on a collar 36 which in turn is mounted on a shaft 37. Surrounding shaft 29 and bearing 31 and fixed to the lower cap 14 by a set screw 38 is a sleeve 39. Sleeve 39 bears against collar 40 which is supported by the frame and which is fixed to bearing 31 by a set screw 41. Surrounding sleeve 39 and fixed thereto is a gear 42. Meshing with gear 42 is a gear 43 mounted on flanged collar 44 which is in turn mounted on shaft 37. Also fixed to shaft 37 is sprocket 26 referred to above for rotating shaft 37. Thus when shaft 37 is rotated by the sprocket 26 the gear train rotates the caps 13 and 14. Sprocket 26 as shown in Figure 3 is rotated in a clockwise direction by depressing the foot pedal 22 and in a counter-clockwise direction by the contraction of spring 28. When the sprocket is being rotated in a particular direction the caps are of course being rotated in the opposite direction.

Referring now to Figures 6–9 and more particularly to Figure 6 the apparatus is shown in a state of repose while the attendant inserts the ends of the wires of the flexible insert through the openings in the projected edges of the caps into the holes located on the top and bottom of the cylinder. The attendant then depresses the foot pedal to spirally wind the insert about the cylinder as shown in Figure 7. The cake is then placed over the spirally wound insert and cap 13 and supported on the outer portion of its lower end by the open ring 12. The attendant then releases the depressed pedal to unwind the insert within the interior of the cake as shown in Figure 8. Figure 9 shows the insert positioned within the cake after the completed operation.

The cycle having now been completed the apparatus is in position for receiving another insert and subsequently another cake.

What is claimed is:

1. An apparatus for applying an expansible insert to a hollow yarn package which comprises a stationary cylinder about which said insert is spirally wound and unwound, said cylinder having means therein adjacent the top and bottom edges thereof for holding the insert in position during winding and unwinding, rotatable caps covering the top and bottom of said cylinder, said caps having portions of which overlap the ends of the cylinder to act as a race for the sides of the expansible insert, said overlapping portions having small openings therein in alignment with said means in the cylinder to guide said insert during winding and unwinding about said cylinder, and means to rotate said caps alternately in opposite directions for winding and unwinding the expansible insert about the stationary cylinder.

2. The apparatus of claim 1 which includes freely rotatable supporting means disposed adjacent the stationary cylinder for supporting said package about said insert during the unwinding of said insert whereby the interior and a portion of the ends of said packages are covered.

3. An apparatus for applying an elongated expansible insert to a hollow yarn package comprising a stationary cylinder about which said insert is wound and unwound, said cylinder having means to hold one end of said elongated insert in position during winding and unwinding, a rotatable end member disposed at each end of said stationary cylinder, means on said rotatable end members slidably engageable with the outer surface of said insert for guiding the same to and from a convolute wound position and drive means for simultaneously rotating said rotatable end members alternately in opposite directions for convolute winding and for unwinding of the elongated expansible insert about the stationary cylinder.

4. An apparatus for applying an elongated expansible insert to a hollow yarn package comprising a stationary cylinder about which said insert is wound and unwound, said cylinder having means to hold one end of said elongated insert stationary during winding and unwinding, a rotatable cap disposed at each end of said stationary cylinder, means on each of said rotatable caps overlapping the respective ends of said stationary cylinder and slidably engaging the insert to guide the same to and from a convolute wound position, drive means for simultaneously rotating said rotatable caps alternately in opposite directions for convolute winding and for unwinding of the elongated expansible insert about the stationary cylinder and means disposed adjacent the cylinder for supporting the package during the unwinding of said insert.

5. Apparatus as set forth in claim 4 wherein the drive means comprises a shaft rotatably mounted within and extending longitudinally of the stationary cylinder for driving one of said caps, a sleeve coaxially mounted about said shaft and rotatably mounted with respect thereto for driving the other of said caps and means for simultaneously rotating said shaft and said sleeve whereby the caps will rotate at substantially the same surface speeds.

References Cited in the file of this patent

UNITED STATES PATENTS

| | | |
|---|---|---|
| 2,298,266 | Bachleda | Oct. 13, 1942 |
| 2,329,286 | Meyer | Sept. 14, 1943 |
| 2,645,554 | De Vault | July 14, 1953 |